(12) United States Patent
Lui

(10) Patent No.: US 7,123,244 B2
(45) Date of Patent: *Oct. 17, 2006

(54) ADAPTIVE INPUT PEN MODE SELECTION

(75) Inventor: Charlton E. Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

This patent is subject to a terminal disclaimer.

(21) Appl. No.: 10/723,645

(22) Filed: Nov. 25, 2003

(65) Prior Publication Data

US 2004/0080499 A1    Apr. 29, 2004

Related U.S. Application Data

(63) Continuation of application No. 09/550,362, filed on Apr. 19, 2000, now Pat. No. 6,683,600.

(51) Int. Cl.
*G09G 5/00* (2006.01)
(52) U.S. Cl. .............................. 345/173; 345/179
(58) Field of Classification Search ........ 345/173–183, 345/863; 178/18.01–19.07; G09G 5/00; G06F 11/00, G06F 17/00, 11/06
See application file for complete search history.

(56) References Cited

U.S. PATENT DOCUMENTS

| 5,231,698 | A | 7/1993 | Forcier |
| 5,523,775 | A | 6/1996 | Capps |
| 5,555,363 | A | 9/1996 | Tou et al. |
| 5,796,406 | A | 8/1998 | Shigematsu et al. |
| 6,128,007 | A | 10/2000 | Seybold |
| 2004/0119763 | A1* | 6/2004 | Mizobuchi et al. .......... 345/863 |

* cited by examiner

*Primary Examiner*—Alexander Eisen
(74) *Attorney, Agent, or Firm*—Merchant & Gould P.C.

(57) ABSTRACT

An adaptive pen mode selection is included within a pen input based computing system. The adaptive pen mode selection automatically switches the operating mode from an input data mode to the data item selection mode when a pen stroke is made over an existing data item to permit it to be selected for editing, deletion and replacement. The adaptive pen mode selection provides an improved user interface returns the computer to the user specified operating mode when the selection operation has been completed to allow the user to continue entering data in the user specified operating mode. With adaptive pen mode selection, a user of a pen input based computing system does not need to change the operating mode of the computer to an data item selection mode using the control inputs in order to select one or more data items for editing.

25 Claims, 7 Drawing Sheets

ADAPTIVE INPUT PEN MODE SELECTION

This application is a continuation of application Ser. No. 09/550,362, filed Apr. 19, 2000 now U.S. Pat. No. 6,683,600, which application(s) are incorporated herein by reference.

TECHNICAL FIELD

This invention relates in general to a method, apparatus, and article of manufacture for providing data input interface for a pen-based computing system, and more particularly to a method, apparatus, and article of manufacture for providing an adaptive input pen mode selection to automatically select existing data items in support of editing operations.

BACKGROUND

Pen input based computing systems are becoming increasingly prevalent with the creation of hand-held computing system. When a user enters data into a pen input based computing system, typically the hand-held computer operates in one of a number of input operating modes. These operating modes may include an ink pen input mode, a text input mode, and a data item selection mode. The operation of the hand-held computer may differ greatly depending upon the operating mode in which the computer is currently set.

When the computer is operating in the ink pen input mode, pen strokes typically are treated as entering graphical pen strokes onto a data window in a similar manner to the drawing of a line onto a sheet of paper. When the computer is operating in the text input mode, the user typically uses a soft input window to enter text characters as if printing or typing at a keyboard. Finally when a computer is operating in the data item selection mode, the pen strokes are interpreted as an instruction to select the data items over which the pen stroke is made.

A user switches between these operating modes by indicating which operating mode is desired using a control input. Control inputs are typically used to specify any number of operational parameters such as input mode operation of a pen input based computing system. These systems typically require the user to constantly change the operating mode between the possible operating modes using the control inputs. As such, a user may interact with the control inputs to constantly switch the operating mode of the user interface between every pen stroke if a complex set of data items is to be edited.

Typically, a user may toggle between one input mode and the data item selection mode as data items are edited, deleted, and replaced. This requirement that the user continually provide input commands to switch the operating mode of the pen input based computer as part of an editing operation decreases the user efficiency in entering data and editing existing data items.

SUMMARY

In accordance with the present invention, the above and other problems are solved by providing an adaptive pen mode selection that automatically switches the operating mode from an input data mode to the data item selection mode when a pen stroke is made over an existing data item to permit it to be selected for editing, deletion and replacement. The adaptive pen mode selection provides an improved user interface by returning the user to a previously specified operating mode when the selection operation has been completed in order to allow the user to continue entering data in the user specified operating mode.

The great utility of the invention is that the user of a pen input based computing system, such as a hand-held computer, does not need to change the operating mode of the computer to a data item selection mode using the control inputs in order to select one or more data items for editing. This utility will improve the user efficiency in operating the pen input based computing system.

One aspect of the present invention is a method of providing an adaptive pen mode selection within a pen input based computing system having one or more user selected operating modes including an ink pen input mode, a text input mode, and a data item selection mode. The method comprises detecting a pen stroke having a location within a window on a display of the computing system, determining the location of the pen stroke upon the display of the computing system, and determining a location of all existing data items displayed within the window containing the location of the pen press. If the computer is operating in the data item selection mode, the method selects all data items having location that corresponds to the location of the pen stroke. If the computer is not operating in the data item selection mode, the method determines whether the user desired to select all data items having location that corresponds to the location of the pen stroke and selects all data items determined to be intended to be selected by the pen stroke.

Another aspect of the present invention is a computer program product readable by a computing system and encoding a set of computer instructions for providing an adaptive pen mode selection within a pen input based computing system. The computing system has one or more user selected operating mode including an ink pen input mode, a text input mode, and a data item selection mode. The computer data product comprises instructions that detect a pen stroke having a location within a window on a display of the computing system, determine the location of the pen stroke upon the display of the computing system, and determine a location of all existing data items displayed within the window containing the location of the pen press. If the computer is operating in the data item selection mode, the computer data product instructs the computing system to select all data items having location that corresponds to the location of the pen stroke. If the computer is not operating in the data item selection mode, the computer data product instructs the computing system to determine whether the user intends to select all data items having location that corresponds to the location of the pen stroke and select all data items determined to be intended to be selected by the pen stroke. The pen stroke possesses properties including the location including a starting location, and ending location, a direction, and one or more segments of constant slope. The properties of the pen stroke are used in determining whether the user intends to select all data items having location that corresponds to the location of the pen stroke. The existing data items possess properties including a data type, a position, a size, and a selection location, and a persistence age. And the properties of the existing data items are used in determining whether the user intends to select all data items having location that corresponds to the location of the pen stroke.

Yet another aspect of the present invention is a pen input based computing system having adaptive pen mode selection within one or more user selected operating mode including an ink pen input mode, a text input mode, and a data item selection mode. The computing system comprises a programmable processor, a user display configured to generate pen strokes corresponding to user created pen movements across the display, one or more data items having properties including a data type, a position, a size, and a selection location, and a persistence age, an user interface module for capturing user generated pen strokes, and a data item input module for determining whether data items are to selected by a pen stroke. The pen stroke possesses properties including the location including a starting location, and ending location, a direction, and one or more segments of constant slope. And the data item input module determines whether the user intends to select all data items having location that corresponds to the location of the pen stroke and selects all data items determined to be intended to be selected by the pen stroke.

These and various other features as well as advantages, which characterize the present invention, will be apparent from a reading of the following detailed description and a review of the associated drawings.

DETAILED DESCRIPTION

Figure 1:
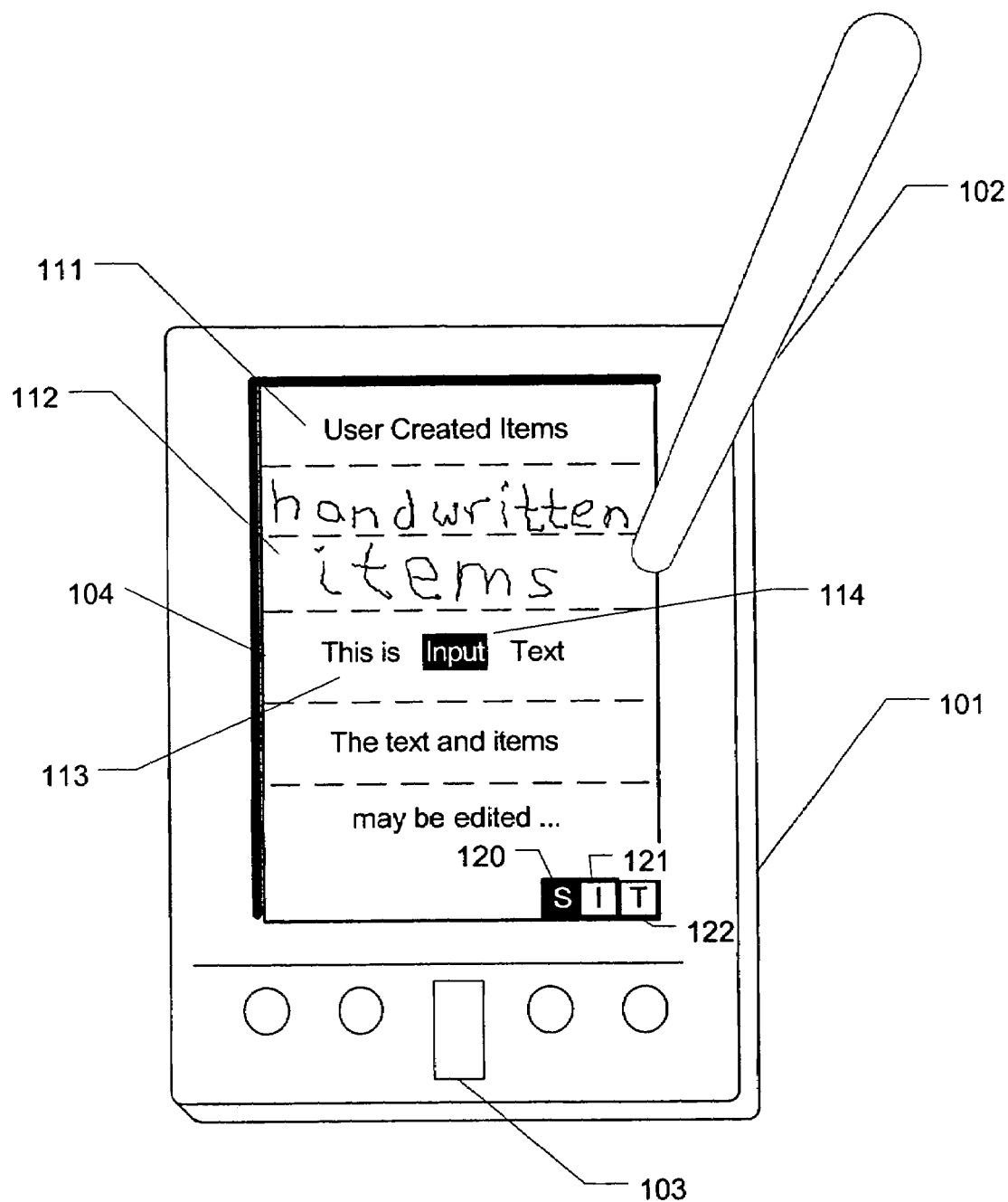
FIG. 1 illustrates a hand-held computer having text data items and hand written data items with a data item highlighted during editing according to one embodiment of the present invention.

FIG. 1 illustrates a hand-held computer having text data items and hand written data items with a data item highlighted during editing according to one embodiment of the present invention. The hand held or palm-sized computer 101 is used with an input pen 102 to enter data items 111–113 by writing on the screen 114. These data items may include user created items 111, hand written items 112, and various text items 113. All of these data items may be edited by selecting all or part of a data item 114 so that the data item 114 can be edited and/or deleted.

The user of the hand held computer 101 typically selects the data item for editing by dragging the cursor over the desired data item 114. When the user drags the cursor over a data item 114, the adaptive pen mode selection will correctly determine whether the user wants the data item highlighted for editing or whether the user wants a line drawn through the data item. The adaptive pen mode selection operations include an interaction between various user interface modules and various pen mode input modules.

The hand-held computer 101 operates in one of a number of input operating modes. These operating modes may include an ink pen input mode, a text input mode, and a data item selection mode. In the ink pen input mode, pen strokes typically are treated as entering graphical pen strokes onto a data window in a similar manner to the drawing of a line onto a sheet of paper. In the text input mode, the user typically uses a soft input window to enter text characters as if printing or typing at a keyboard. In the data item selection mode, the pen strokes are interpreted as an instruction to select the data items over which the pen stroke is made.

A user switches between these operating modes by indicating which operating mode is desired using control inputs 120–122. When a user presses the pen 120 on top of one of these control inputs 120–122, the control input is highlighted, and the hand-held computer is placed into the corresponding operating mode. The control inputs will select a data item selection mode 120, an ink pen input mode 121, and a text input mode 122. These input controls may include also selection buttons such as radio buttons that a user can activate or deactivate as desired. These controls may also include pop-up menu options that are selected using a pointing device such as a pen 102 to set the current operating mode. Any other user interface command input method may be used to select the operating mode for the computer without deviating from the spirit and scope of the present invention.

Figure 2:
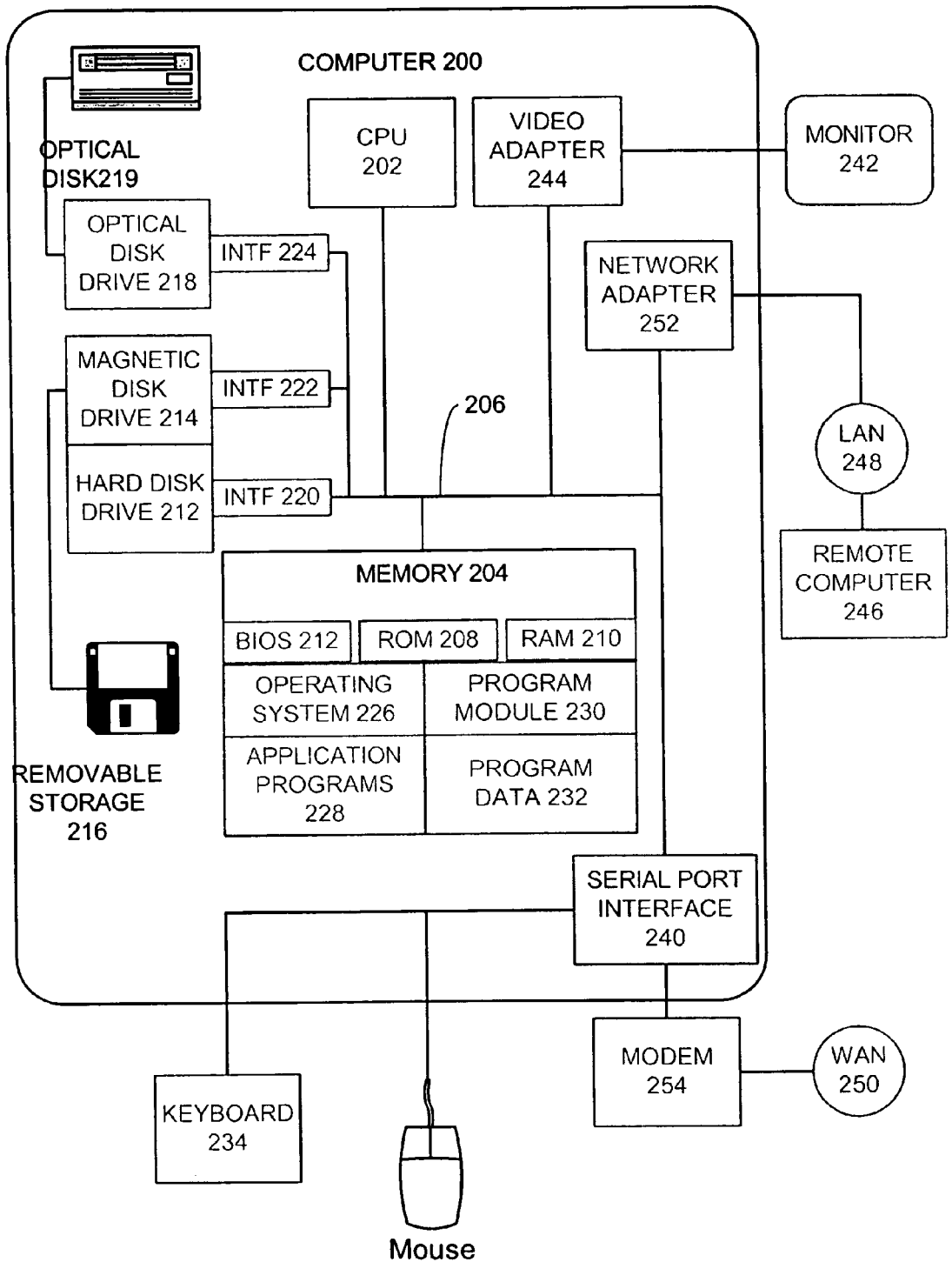
FIG. 2 illustrates a general purpose computing system for use as one more computing systems according to another embodiment of the present invention.

FIG. 2 illustrates a computing system that may be used as the hand-held computing system according to one embodiment of the present invention. An exemplary computing system for embodiments of the invention includes a general purpose-computing device in the form of a conventional computer system 200 capable of accepting pen-based input data. The system includes a processor unit 202, a system memory 204, and a system bus 206 that couples various system components including the system memory 204 to the processor unit 200. The system bus 206 may be any of several types of bus structures including a memory bus, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the computer system 200, is stored in ROM 208.

The computer system 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the computer system 200.

Although the exemplary environment described herein may employ a hard disk, a removable magnetic disk 316, and a removable optical disk 219, other types of computer readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the computer system 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). An LCD display 242 or other type of display device is also connected to the system bus 206 via an interface, such as a video adapter 244. In addition to the display 242, computer systems typically include other peripheral output to devices (not shown), such as speakers and printers.

The computer system 200 may operate in a networked environment using logical connections to one or more remote computers, such as a remote computer 246. The remote computer 246 may be a computer system, a server, a router, a network PC, a peer device or other common network node, and typically includes many or all of the elements described above relative to the computer system 200. The network connections include a local area network (LAN) 248 and a wide area network (WAN) 250. Such networking environments are commonplace in offices, enterprise-wide computer networks, intranets, and the Internet.

When used in a LAN networking environment, the computer system 200 is connected to the local network 248 through a network interface or adapter 252. When used in a WAN networking environment, the computer system 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the computer system 200, or portions thereof, may be stored in the remote memory storage device. It will be appreciated that the network connections shown are exemplary and other means of establishing a communications link between the computers may be used.

The embodiments of the invention described herein are implemented as logical operations in a hand-held or palm-sized computing system capable of accepting pen-based input data. The logical operations are implemented (1) as a sequence of computer implemented steps or program modules running on a computer system and (2) as interconnected logic or hardware modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 3:
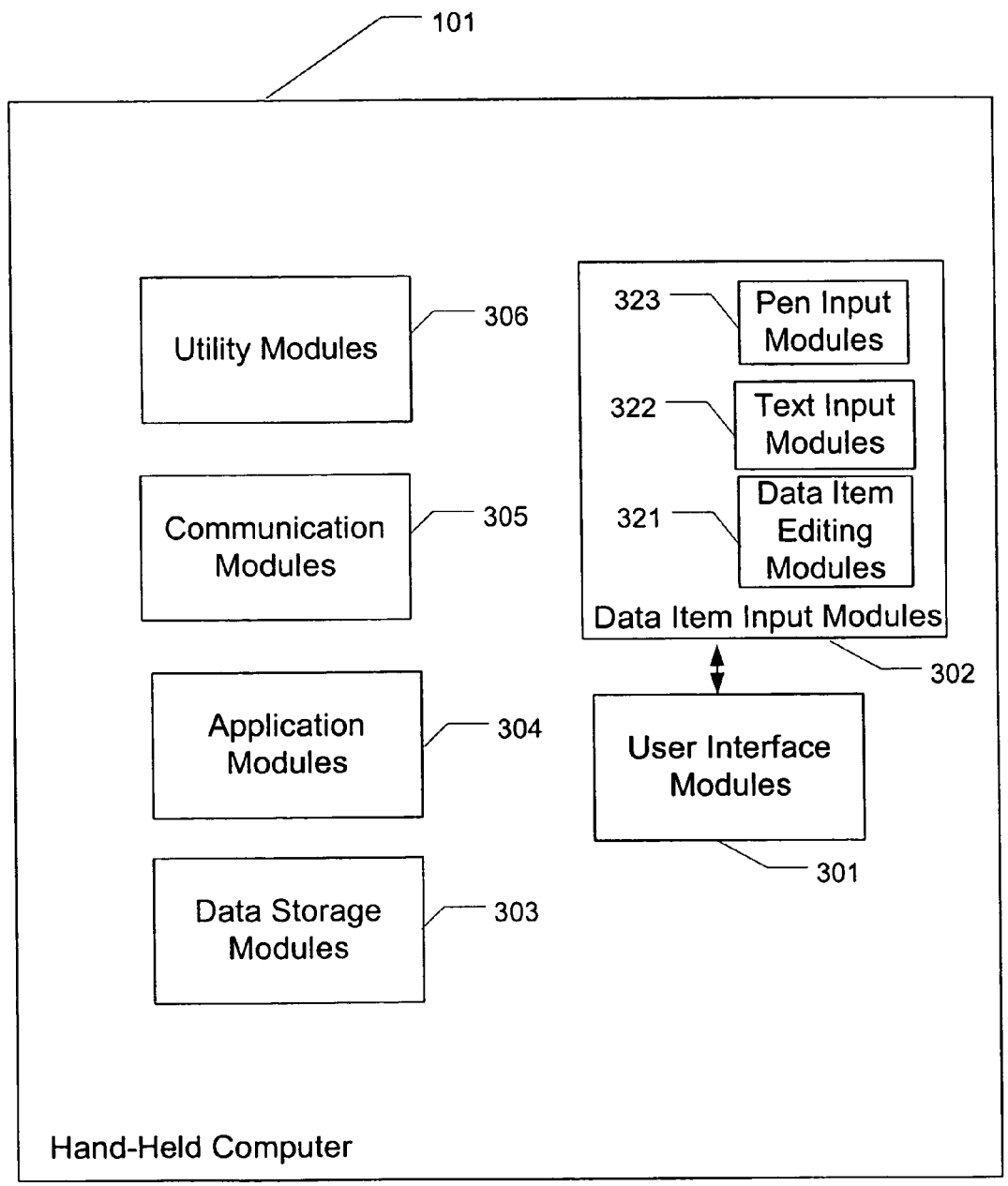
FIG. 3 illustrates a hand-held computer having processing modules to implement a pen-based user interface according to another embodiment of the present invention.

FIG. 3 illustrates a hand-held computer having processing modules to implement a pen-based user interface according to another embodiment of the present invention. The hand-held computer includes various processing modules used to implement its functions. These processing modules include a user interface module 301, a data item input module 302, a data storage module 303, one or more application modules 304, a communication module 305, and a utility module 306. The application modules 304 typically include a personal information manager (PIM) having a date book, address book, notepad, and to do list. The application modules 304 interact with the data storage module 303, data item input module 302, user interface module 301, communication module 305, and utility module 306 to provide the desired functionality.

The adaptive pen mode selection processing is performed within the data item input module 302 utilizing a pen input module 323, a text input module 322, and a data item editing module 321. The data item input module 302 interacts with other user interface modules 301 to provide the interaction with the user when the user draws data items on the display 104 of the hand held computer using a pen 102. The pen input modules 323 interpret pen strokes drawn on the display 104 of the hand held computer 101, including when the hand held computer 101 is operating in a pen input mode. The text input modules 322 interpret input commands to enter text data such as ASCII characters when the hand held computer 101 is operating in a text input mode. The data item editing modules 321 interpret pen strokes and input commands to select, edit, and delete the data items stored within the hand held computer 101. These modules 321–323 interact with other user interface modules 301 to provide this functionality to the user of the hand held computer 101.

Figure 4:
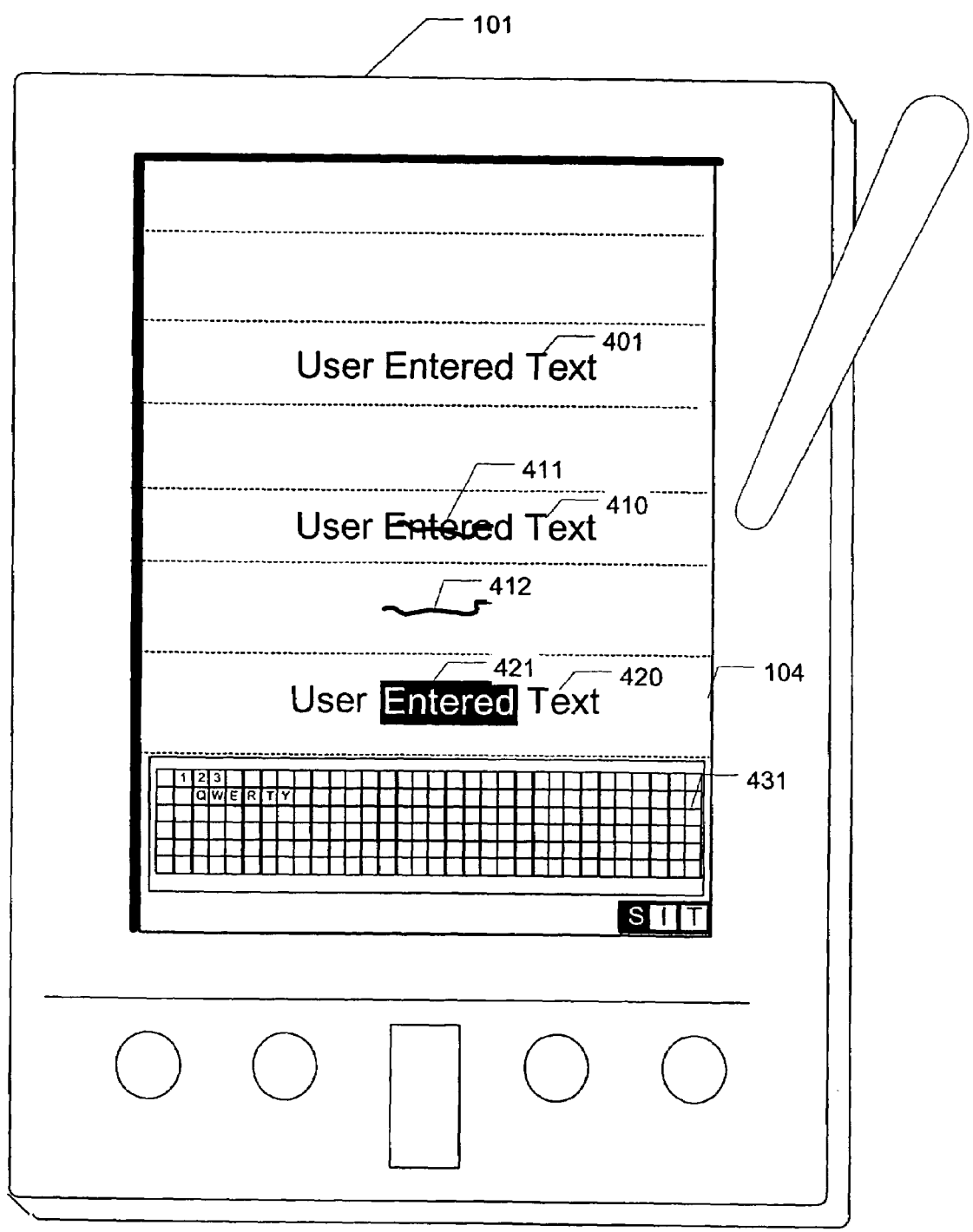
FIG. 4 illustrates a hand-held computing system having multiple data items in which data items may be selected according to one embodiment of the present invention.

FIG. 4 illustrates a hand-held computing system having multiple data items in which data items may be selected according to one embodiment of the present invention. Several text data items 401–420 are illustrated on the display 104 of the hand-held computer 101. When a user desires to edit one or more words within a text data item, the user selects the word and enters the changes. Typically, the hand-held computer operates in one of several operating modes. These operating modes include a pen input mode, a text input mode, and a data item selection mode.

When the hand-held computer is operating in the pen input mode, the user's pen strokes on the screen are interpreted as entering corresponding pen ink marks in a data window in which the pen stroke is made. In this operating mode, the pen strokes create hand-written data similar to a hand-written pen stroke made upon a page. The data is typically captured as a sequence of graphic pen strokes; however, the data may also be represented using bit-mapped graphics and other mechanisms for capturing and representing hand-written, user entered data items.

When the hand-held computer is operating in the text input mode, a soft input window 431 appears upon the display 104 of the hand-held computer 101 to allow a user to enter text characters into the computer 101. This soft input window 431 provides a user with an on-screen keyboard in which individual ASCII characters may be entered. The soft input window 431 may also present a user with an input pen stroke drawing area in which individual characters or words may be entered and interpreted. The ASCII text input in this operating mode will appear as text on the display 104 as if the text was entered using a standard keyboard.

When the hand-held computer is operating in the data item selection mode, the user pen strokes made upon the display 104 are interpreted as an attempt to select a data item located beneath the pen stroke in order to permit the data item to be edited or deleted. This operation is similar to the operation of a desktop computer in which items are selected by dragging a cursor over the items using a pointing device such as a mouse or trackball.

An example of the operation of a hand-held computer in both the pen input mode and the data item selection mode are illustrated in FIG. 4. Three identical text data items 401, 410, and 420 are positioned on different lines of the display 104 of the hand-held computer. The second text data item 410 illustrates the result that occurs when a pen stroke is made across the word "Entered" when the hand-held computer is operating in the pen input mode. The pen stroke results in the creation of a pen ink line 411 that is located on top of the text word. This result is similar to the result when a user draws a line over a word when both are printed on a sheet of paper.

The third text data item 420 illustrates the result that occurs when a pen stroke is again made across the word "Entered" when the hand-held computer is operating in the data item selection mode. In this mode, the pen stroke is interpreted as an instruction to select the word "Entered" 421. The operation will result in the word "Entered" being 421 being selected. The selected word 421 is displayed in a highlighted display mode. Once the data item 421 is selected, it may be deleted, edited, cut, or replaced using a corresponding command.

When the hand-held computer is operating in an adaptive pen mode, the result will be the same as shown in data items 420–421. This result is identical to the hand-held computer operating in the data item selection mode when the pen stroke is over an existing data item. Similarly, the result would be the creation of an ink pen stroke 412 similar to the operation in the pen input mode only when the pen stroke is not located over an existing data item. The operation of the adaptive pen mode selection processing causes the operating mode of the hand-held computer 101 to correctly switch to the appropriate operating mode. The adaptive pen mode selection processing makes these determinations based upon the location of the pen stroke as well as other defining characteristics. These other characteristics may include, but are not limited to, the direction of the pen stroke (L-to-R or R-to-L), the percentage of a word(s) over which the pen stroke is made, the placement of the pen stroke within the word (top, middle, bottom), the age of the data item over which the pen stroke is made, and characteristics of the data item itself.

Figure 5:
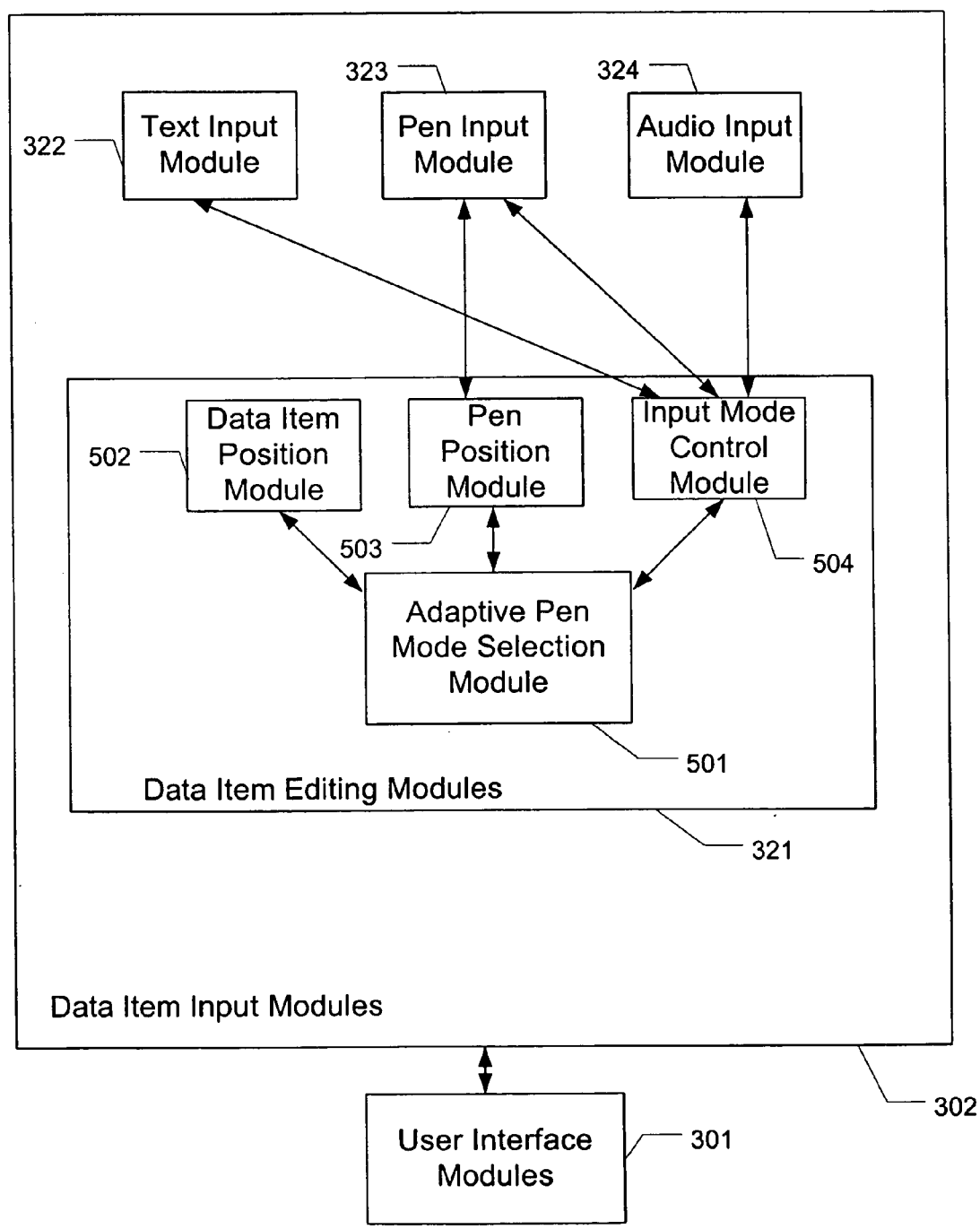
FIG. 5 illustrates a data item input module according to one possible embodiment of the present invention.

FIG. 5 illustrates a data item input module according to one possible embodiment of the present invention. The data item input module 302 interacts with one or more user interface modules 301 to accept the input of data items, to permit existing data items to be altered and deleted, and to pass these data items to various application modules 304 for use in creating, editing, and displaying data within a window on a hand-held computer 101. The data item input modules comprises a text input module 322 to permit text data to be entered into the hand-held computer 101 and a pen input module 323 to permit pen ink data to be entered into the hand-held computer 101. The data item input module might also support other formats for data, such as the entry of audio data using an audio input module 324. The other data formats would possess a corresponding input module for accepting the input of the data from the user and processing the data into a format that may be represented and stored within the hand-held computer. The data would be represented upon the display of the hand-held computer at least as an icon that may be selected, edited and deleted in the same manner that ink and text data is manipulated herein.

The data item input module 302 also comprises a data item editing module 321 that performs the selection processing, including the adaptive pen mode selection processing described herein. The data item editing module 321 comprises a data item position module 502, a pen position module 503, and an input mode control module 504 that all interact with an adaptive pen mode selection module 501 to perform the data item selection and editing operations.

The data item position module 502 determines the position of data items that are located within a window within the hand-held computer 101. These positions are needed to determine whether a new pen stroke is located over an existing data item, and if so, where within the existing data item the pen stroke has been made. Similarly, the pen position module 503 provides the position information for the pen stroke, as well as its direction of movement. This information is used by the adaptive pen mode selection module 501 to determine if the pen stroke should cause the operating mode of the hand-held computer to switch to the data item selection mode.

The input mode control module 504 performs the operation necessary to maintain the various operating modes as well as to detect instructions to switch from one mode to another. Typically, an input control 120–122 exists within the user interface to permit the user to indicate the operating mode that he or she wishes the computer 101 to be operating. These input controls 120–122 may include selection buttons such as radio buttons that a user can activate or deactivate as desired. These input controls may also include other user interface input options as described earlier.

The adaptive pen mode selection module 501 accepts data from the other modules within the data item editing module 321 to determine whether the most recent pen stroke should be interpreted as an instruction to select an existing data item regardless of the particular operating mode currently selected for the hand-held computer. The particular operation performed by the adaptive pen mode selection module 501 are best illustrated using the particular examples shown in FIGS. 6a, 6b and 6c.

Figure 6A:
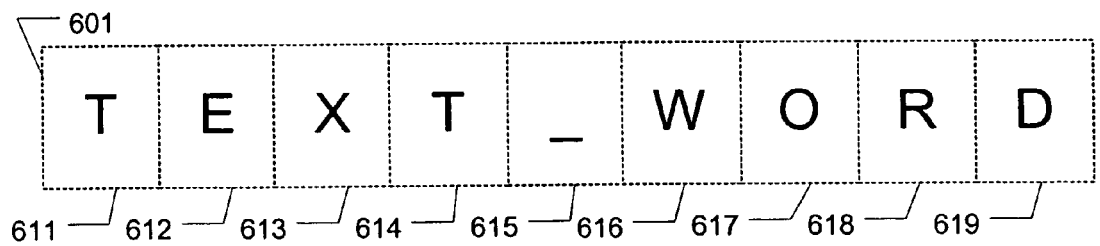
FIGS. 6a–c illustrates various data items and corresponding pen strokes according to one possible embodiment of the present invention.
Figure 6B:
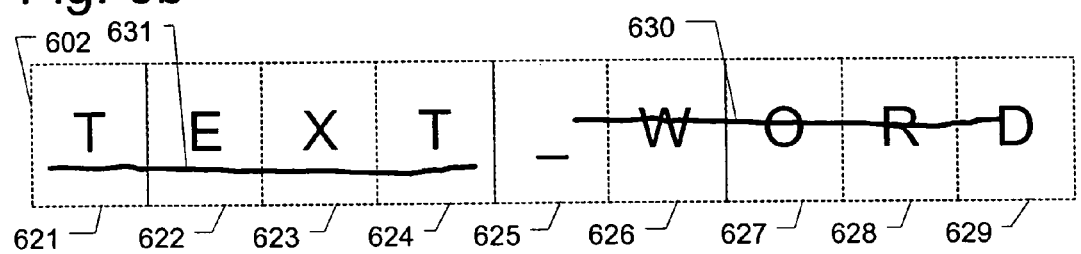
Figure 6C:
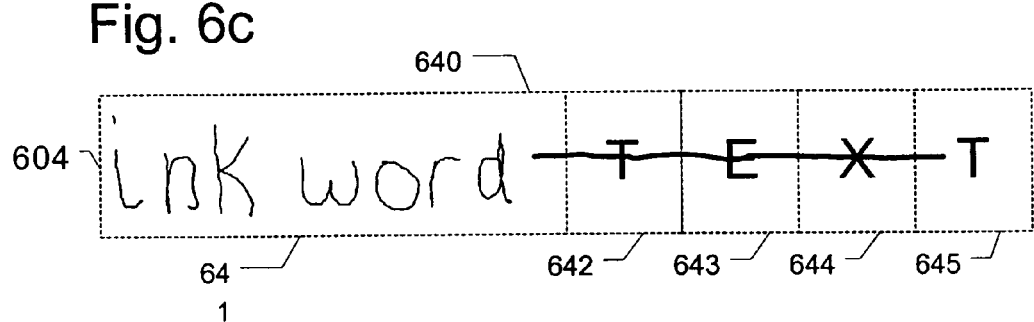

FIGS. 6a, 6b and 6c illustrates various data items and corresponding pen strokes according to one possible embodiment of the present invention. FIG. 6a illustrates a two-word data item 601 that comprises a sequence of text data characters 611–619. Within each of the text data characters 611–619, particular character values may be associated with the text data characters. By viewing the sequence of text data characters as an array containing character data, two words, "text" 611–614 and "word" 616–619, are found that are separated by a space character 615, which is indicated by "_" character. Each of these text data characters possess various properties. These properties include an x,y position within a window, an x,y size, a ASCII character value, and an indication of when the character was created or if the character is considered to be "persistent." A character is persistent if the character has existed for a period of time greater than a pre-defined_time period. The property is intended to distinguish newly created data items, which may not be completely entered from data items that have existed long enough to be considered complete.

FIG. 6b illustrates the sequence of text data items 621–629 containing two words as discussed above along with two pen strokes made in the middle of a word 630 and made below another word 631. Each pen stroke possesses properties that indicate its starting position, its ending position, and any other position data needed to adequately characterize and describe the pen stroke. This other data may include the slope of the pen stroke, the direction of pen stroke, and any intermediate segment information necessary to describe the pen stroke. Typically a pen stroke is described as a sequence of segments that approximate linear lines having a constant slope. When the slope changes, a new segment is created.

Considering the first of the two pen strokes 630–631 within FIG. 6b, the pen stroke 631 is generally positioned at the middle of the text data characters 626–629 containing "WORD." The pen stroke has one end within the space text data item 625 and the other end within the "D" text data item 629. The pen stroke is a L-to-R pen stroke if it was drawn from the space 625 to the D 629. Similarly, pen stroke is a R-to-L pen stroke if it was drawn from the D 629 to the space 625.

In contrast, consider the second of the two pen strokes 632 within FIG. 6b. This pen stroke 632 is positioned below the text in data characters 621–624 containing "TEXT." The pen stroke has one end within the first "T" text data item 621 and the other end within the second "T" text data item 624. The pen stroke is a L-to-R pen stroke if it was drawn from the first T 621 to the second T 624. Similarly, pen stroke is a R-to-L pen stroke if it was drawn from the second T 624 to the first T 621.

The adaptive pen mode selection module 501 will use the properties of the data items 621–629 and the pen strokes 630–631 to determine whether a particular pen stroke should be treated as a selection instruction for the data item(s) beneath the pen stroke or whether the pen stroke is to be treated as an input pen stroke. If the pen stroke is to be treated as a selection instruction, the data items will be selected and highlighted. If the pen stroke is to be treated as an input pen stroke, an ink line will be drawn where the pen stroke was located.

While the above example uses a sequence of text data characters, and thus the characters appear to possess a uniform size, this example may be readily extended to other sequences. Such sequences include a sequence of ink data items, a sequence of audio icons, a sequence of video icon, or a combination of data items possessing the above properties.

FIG. 6c illustrates a combination of a pen ink data item with a sequence of text data items. An ink data item 641 is shown next to a sequence of text data items 642–645. A pen stroke 640 has one end within the ink data item 641 and another end within the "T" text character data item 645. The processing in FIG. 6c is the same as discussed above in FIG. 6b. Any combination of data items may be used without deviating from the spirit and scope of the present invention as set forth in the claims recited herein.

Figure 7:
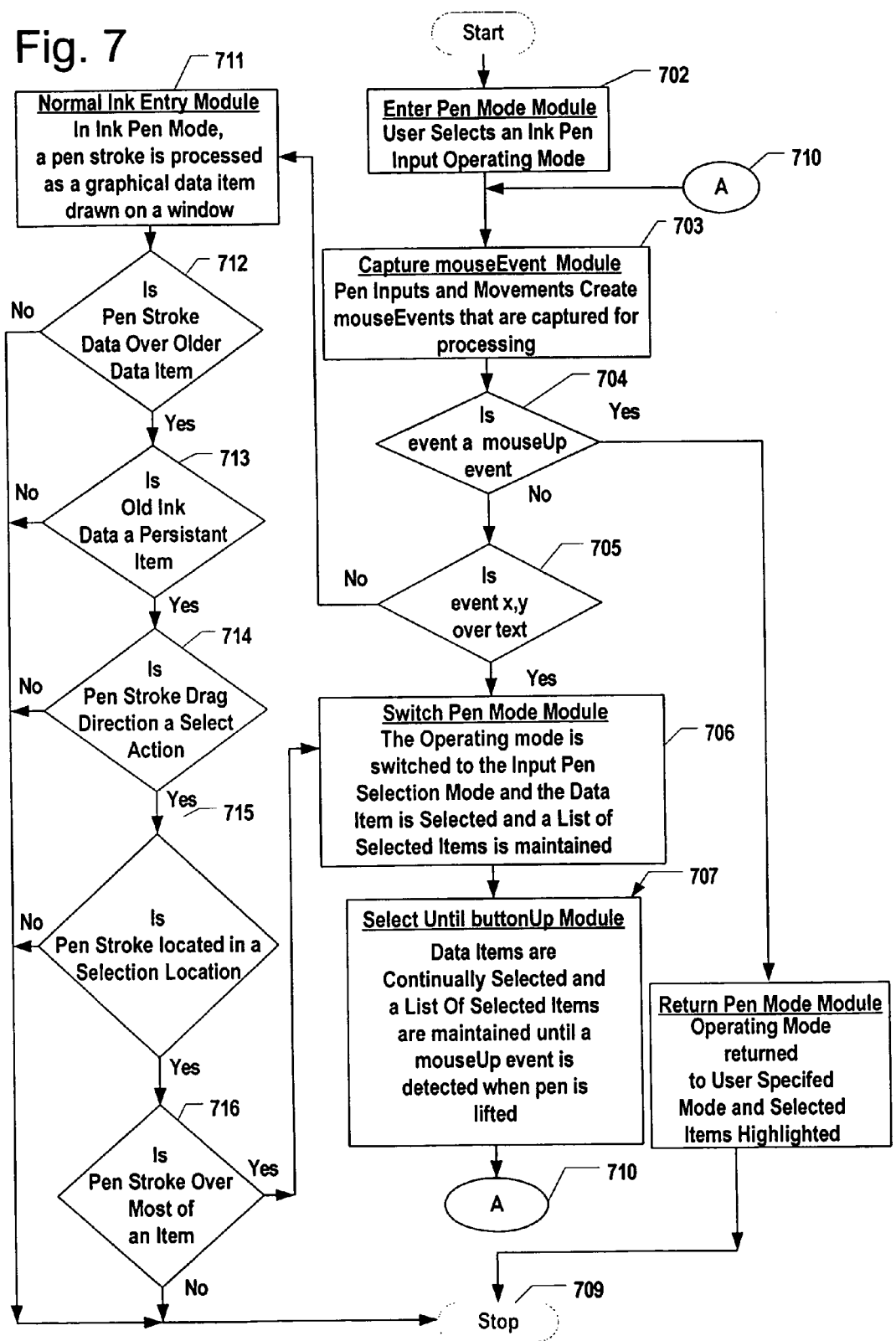
FIG. 7 illustrates an operational flow for an adaptive pen mode selection process according to an example embodiment of the present invention.

FIG. 7 illustrates an operational flow for adaptive pen mode selection according to an exemplary preferred embodiment of the present invention. The operation of the hand-held computer begins at 701, and the Enter Pen Mode Module 702 is operative when the user instructs the computer 101 to operate in the pen input mode using an appropriate control input. The Enter Pen Mode Module 702 configures the operation of the user interface of the hand-held computer to operate in the pen input mode. In this operating mode, the movement of a pen 102 across the display 104 will create a pen stroke within the window shown on top of the display.

When a user presses the pen 102 onto the display 104, a buttonDown event is triggered. The Capture Mouse Event Module 703 recognizes this event and begins the operational flow for the adaptive pen mode selection. The Capture Mouse Event Module 703 also captures mouseMove events and buttonUp events. Once one of the events is captured, test operation 704 checks to determine if the event is a buttonUp event. Typically, the processing begins with buttonDown event when the pen 102 is first placed onto the display 104 and continues until the occurrence of a buttonUp event when the pen 102 is lifted from the display 104. The x,y location of the buttonDown event corresponds to the first end of a pen stroke. Similarly, the x,y location of the buttonUp event corresponds to the second end of the pen stroke. The sequence of mouseMove events defines the movement of the pen 102 across the display that defines the direction and length of the pen stroke.

If the event is not a buttonUp event, the operation proceeds to test operation 705. In test operation 705, the x,y location of the event is checked to see if it is located over a text data item. If the event is located over a text data item, the adaptive pen mode selection assumes that the user wants to select the text item rather than draw a pen stroke over the text item. As such, the operational flow continues to a Switch Pen Mode Module 706. The Switch Pen Mode Module 706 temporarily places the operation of the computer 101 into an input select mode from any other operating mode and selects the text data item. The hand-held computer 101 will continue in this operating mode, and will continue in selecting additional data items beneath the pen stroke, until a buttonUp event is detected. The additional data items are selected within the Select Until buttonUp Module 707, with the Module 707 maintaining a list of all currently selected items. Once the latest data item has been included within the list of selected data items, the operational flow returns to the Capture mouseEvent module 703 to obtain the next mouse event until a buttonUp event is detected.

Returning to test operation 705 if the event tested is not located over a text data item, the operational flow continues to a Normal Ink Entry module 711. In this module 711, the event is processed as if the pen is intending to enter an ink pen stroke onto the window of the hand-held computer 101. The operational flow continues to determine if the adaptive pen mode selection should switch from an ink pen mode to a data item selection mode based upon the characteristics of the pen stroke. This determination continues with test operation 712 to determine if the newly entered pen stroke is now over an existing data item. If the stroke is not over an existing data item, the operation flow branches NO, and the processing ends at 709 as the pen stroke is being made on an empty portion of the window.

If test operation 712 determines that the newly entered pen stroke is located over an existing data item, test operation 713 is used to determine if the existing data item is considered persistent. A persistent data item is a data item that has been present within the computer 101 for greater than a predetermined period of time. In a preferred embodiment, the predetermined period of time is 2 seconds. The assumption is that user will be adding additional handwritten pen strokes to a data item within this short period of time. For example, a user may dot an "i" or cross a "t" shortly after the character itself has been printed; however, the user will be selecting the "i" or "t" if the character was written a few days before. If test operation 713 determines that the existing data item is not persistent, the processing ends at 709 as the assumption is made that the latest pen stroke is part of a newly created data item.

If test operation 713 determines that the existing data item is persistent, test operation 714 will check to see if the pen stroke possesses a drag direction indicating a selection action. As was discussed above, pen strokes possess properties including a drag direction indicating if the pen stroke has been made in a left-to-right or a right-to-left direction. The adaptive pen mode selection may distinguish selection operations over existing data items by requiring the pen strokes to occur in one of the two directions with the other direction being used to place a pen stroke over an existing data item. Typically, a system parameter is set to indicate the direction of the selection action. If the drag direction of the pen stroke is not the same as the selection action, the processing ends at 709 as the pen stroke is interpreted as being a stroke operation and not a selection operation. If the drag direction of the pen stroke is the same as the selection action, the processing continues to test operation 715.

Test operation 715 checks to see if the pen stroke is located within a selection location for a particular data item. As was discussed above with regards to FIG. 6, a pen stroke may be made over data items near the top, in the middle, and near the bottom of the individual data items. These locations generally correspond to above, in the middle, and below meaningful information within data items. An assumption is made that an item is to be selected only when the pen stroke is made "in the middle" of the data item. The selection location is used to define a region of the data item through which a pen stroke is made that will be interpreted as being "in the middle." A system parameter may specify the range of locations about its center, which may be interpreted as being "in the middle." This range may be as narrow or wide as desired by a user. If test operation 715 determines that the pen stroke is not within the selection location, the processing ends at 709, as the pen stroke is not in the middle of the data item.

If test operation 715 determines that the pen stroke is within the selection location, test operation 716 is used to determine if "most" of an item has been "selected." As the pen stroke moves across a data item through its selection location, a determination needs to be made whether the item in question should be selected as part of the current operation. In FIG. 6b, one end of the pen stroke began within the space text character 626 and the other end of the pen stroke terminated within the D text character 629. If the data items are considered to be separate characters, the adaptive pen mode selection determines whether these end characters should be included within the list of selected items. This determination may be made by checking to see if the pen stroke has been made over more than 50% of the data item. If so the data item should be selected. For text data items, a sequence of text data items may check for the existence of words separated by spaces and/or punctuation characters. In such a case, the entire word may be selected when more than 50% of its characters have been covered by a pen stroke. FIG. 6b illustrates this operation as the pen stroke 640 begins within the ink pen data item 641 and then covers all of the adjoining text data items 642–645. Because the pen stroke 640 does not cover a significant portion of the ink pen data item 641, the pen stroke 640 selects just the text data items 642–645.

If test operation 716 determines that most of a data item is not covered by the pen stroke, the processing ends at 709. If test operation 716 determines that most of a data item is covered by the pen stroke, the processing continues with the Switch Pen Mode Selection module 706 as discussed above. The data item will be selected and the processing will continue in the select pen mode until a mouseUp event is detected.

Returning to test operation 704 if the captured mouseEvent is a mouseUp, the pen stroke is considered ended. If test operation 704 determines that the captured mouseEvent is a mouseUp, the processing continues to a Return Pen Mode module 708 to set the operating mode back to its original user specified operating mode. If the operating mode had been switched to the input pen selection mode from another operating mode, an item is selected and highlighted; however, the pen should be returned to its user selected operating mode. If the operating mode had not been switched to the input pen selection mode from another operating mode, the Return Pen Mode module 708 performs no operation. If the operating mode was originally in the input pen selection mode, the Return Pen Mode module 708 also performs no operation. Now that the operating mode has been returned to its original mode, the user may enter another pen stroke if desired. If one or more data items have been selected, the data items will appear as highlighted items that may be cut, deleted or replaced with one or more data items using a paste command. These additional editing operations are not part of the adaptive pen mode selection operations.

While the preferred embodiment includes the sequence of test operations 712–716 to determine whether a pen stroke drawn over a data item should cause the data item to be selected, one skilled in the art will understand that other embodiments of the present invention may include only some, but not all, of these test operations 712–716 in making this determination.

The present invention is presently embodied as a method, apparatus, and computer program product, such as a computer storage medium or propagated signal containing a computer program, for providing an adaptive pen mode selection function as part of a data input portion of a user interface within a hand-held computer. While the embodiments described above describe a hand-held computer for its operation, the present invention, as recited within the claims attached hereto, includes any computing system that utilizes a pointing device to enter ink data items and text data items as discussed hereon. While the invention has been particularly shown and described with reference to preferred embodiments thereof, it will be understood by those skilled in the art that various other changes in the form and details may be made therein without departing form the spirit and scope of the invention.

What is claimed is:

1. A method of providing an adaptive pen mode selection within a pen input based computing system having one or more user selected operating modes including an ink pen input mode, a text input mode, and a data item selection mode, the method comprising:

detecting a pen stroke having a location within a window on a display of the computing system, the pen stroke possesses properties including the location including a starting location, and ending location, a direction, and one or more segments of constant slope;

determining a location of all existing data items displayed within the window containing the location of the pen press, the existing data items possess properties including a data type, a position, a size, and a selection location, and a persistence age;

if the computer is operating in the data item selection mode, selecting all data items having location that corresponds to the location of the pen stroke;

if the computer is not operating in the data item selection mode, perform the following:

determining whether the user desired to select all data items having location that corresponds to the location of the pen stroke using one or more of the properties associated with the pen stroke and the existing data items; and selecting all data items determined to be intended to be selected by the pen stroke.

2. The method according to claim 1, wherein the pen stroke possesses properties including the location including a starting location, and ending location, a direction, and one or more segments of constant slope; and the properties of the pen stroke are used in determining whether the user intends to select all data items having location that corresponds to the location of the pen stroke.

3. The method according to claim 2, wherein the existing data items possess properties including a data type, a position, a size, and a selection location, and a persistence age; and the properties of the existing data items are used in determining whether the user intends to select all data items having location that corresponds to the location of the pen stroke.

4. The method according to claim 1, wherein the selecting all data items determined to be intended to be selected by the pen stroke further comprises:

switching the computing system to the data item selection mode;

selecting all data items identified to correspond to the pen stroke; and switching the computing system back to the previous user selected operating mode.

5. The method according to claim 1, wherein the selection location for the data item comprises a selection location, a selection size, and a selection direction;

a pen stroke is within the selection location when the pen stroke location corresponds to a location within the area defined by the selection location, the selection size, and the selection direction.

6. The method according to claim 5, wherein the determining whether the user intends to select all data items having location that corresponds to the location of the pen stroke further comprises:

determining if direction of the pen stroke is in a selection direction;

determining if the location of the pen stroke is within the selection location of all data items; and if direction of the pen stroke is in a selection direction, selecting all data items in which the pen stroke is within the selection location.

7. The method according to claim 5, wherein the selecting all data items determined to be intended to be selected by the pen stroke further comprises:

determining if direction of the pen stroke is in a selection direction;

determining if the location of the pen stroke is within the selection location of all data items;

determining if the persistent age of all data items is greater than a predetermined period;

determining the length of the pen stroke across each data item; and if direction of the pen stroke is in a selection direction, selecting all data items in which the pen stroke is within the selection location when the persistent age is greater than the predetermined period and when the length of the pen stroke across a data item is greater than 50% of the size of the data item in the direction of the selection direction.

8. The method according to claim 7, wherein the predetermined period is 2 seconds and the selection direction is left-to-right.

9. The method according to claim 7, wherein the selection location corresponds to the middle of the vertical side of a data item; and the selection size corresponds to 25 to 50% of the size of the data item centered around the selection location.

10. A computer program product readable by a computing system and encoding a set of computer instructions for providing an adaptive pen mode selection within a pen input based computing system having one or more user selected operating mode including an ink pen input mode, a text input mode, and a data item selection mode, comprising:

detecting a pen stroke having a location within a window on a display of the computing system, the pen stroke possesses properties including the location including a starting location, and ending location, a direction, and one or more segments of constant slope;

determining a location of all existing data items displayed within the window containing the location of the pen press, the existing data items possess properties including a data type, a position, a size, and a selection location, and a persistence age;

if the computer is operating in the data item selection mode, selecting all data items having location that corresponds to the location of the pen stroke;

if the computer is not operating in the data item selection mode, perform the following:

determining whether the user desired to select all data items having location that corresponds to the location of the pen stroke using the direction property of the pen stroke and the persistence age of the existing data items; and selecting all data items determined to be intended to be selected by the pen stroke;

wherein the pen stroke possesses properties including the location including a starting location, and ending location, a direction, and one or more segments of constant slope;

the properties of the pen stroke are used in determining whether the user intends to select all data items having location that corresponds to the location of the pen stroke;

the existing data items possess properties including a data type, a position, a size, and a selection location, and a persistence age; and the properties of the existing data items are used in determining whether the user intends to select all data items having location that corresponds to the location of the pen stroke.

11. The computer program product according to claim 10, wherein the selecting all data items determined to be intended to be selected by the pen stroke further comprises:

switching the computing system to the data item selection mode;

selecting all data items identified to correspond to the pen stroke; and switching the computing system back to the previous user selected operating mode.

12. The computer program product according to claim 10, wherein the selection location for the data item comprises a selection location, a selection size, and a selection direction;

a pen stroke is within the selection location when the pen stroke location corresponds to a location within the area defined by the selection location, the selection size, and the selection direction.

13. The computer program product according to claim 12, wherein the determining whether the user intends to select all data items having location that corresponds to the location of the pen stroke further comprises:
  determining if direction of the pen stroke is in a selection direction;
  determining if the location of the pen stroke is within the selection location of all data items; and
  if direction of the pen stroke is in a selection direction, selecting all data items in which the pen stroke is within the selection location.

14. The computer program product according to claim 12, wherein the selecting all data items determined to be intended to be selected by the pen stroke further comprises:
  determining if direction of the pen stroke is in a selection direction;
  determining if the location of the pen stroke is within the selection location of all data items;
  determining if the persistent age of all data items is greater than a predetermined period;
  determining the length of the pen stroke across each data item; and
  if direction of the pen stroke is in a selection direction, selecting all data items in which the pen stroke is within the selection location when the persistent age is greater than the predetermined period and when the length of the pen stroke across a data item is greater than 50% of the size of the data item in the direction of the selection direction.

15. The computer program product according to claim 14, wherein the predetermined period is 2 seconds and the selection direction is left-to-right.

16. The computer program product according to claim 14, wherein the selection location corresponds to the middle of the vertical side of a data item; and
  the selection size corresponds to 25% of the size of the data item centered around the selection location.

17. A pen input based computing system having adaptive pen mode selection within one or more user selected operating mode including an ink pen input mode, a text input mode, and a data item selection mode, the computing system comprising:
  a programmable processor;
  a user display configured to generate pen strokes corresponding to user created pen movements across the display;
  one or more data items having properties including a data type, a position, a size, and a selection location, and a persistence age;
  an user interface module for capturing user generated pen strokes; and
  a data item input module for determining whether data items are to selected by a pen stroke;
  wherein
  the pen stroke possesses properties including the location including a starting location, and ending location, a direction, and one or more segments of constant slope; and
  the data item input module determines whether the user intends to select all data items having location that corresponds to the location of the pen stroke using the direction property of the pen stroke and the persistence age of the existing data items and selects all data items determined to be intended to be selected by the pen stroke.

18. The computing system according to claim 17, wherein the properties of the pen stroke are used in determining whether the user intends to select all data items having location that corresponds to the location of the pen stroke.

19. The computing system according to claim 18, wherein the properties of the existing data items are also used when the data item input module determines whether the user intends to select all data items having location that corresponds to the location of the pen stroke.

20. The computing system according to claim 18, wherein the data item input module selects all data items determined to be intended to be selected by the pen stroke by performing the following:
  switching the computing system to the data item selection mode;
  selecting all data items identified to correspond to the pen stroke; and
  switching the computing system back to the previous user selected operating mode.

21. The computing system according to claim 20, wherein the selection location for the data item comprises a selection location, a selection size, and a selection direction;
  a pen stroke is within the selection location when the pen stroke location corresponds to a location within the area defined by the selection location, the selection size, and the selection direction.

22. The computing system according to claim 21, wherein the data item input module determines whether the user intends to select all data items having location that corresponds to the location of the pen stroke further comprises:
  determining if direction of the pen stroke is in a selection direction;
  determining if the location of the pen stroke is within the selection location of all data items; and
  if direction of the pen stroke is in a selection direction, selecting all data items in which the pen stroke is within the selection location.

23. The computing system according to claim 21, wherein the data item input module selects all data items determined to be intended to be selected by performing the following:
  determining if direction of the pen stroke is in a selection direction;
  determining if the location of the pen stroke is within the selection location of all data items;
  determining if the persistent age of all data items is greater than a predetermined period;
  determining the length of the pen stroke across each data item; and
  if direction of the pen stroke is in a selection direction, selecting all data items in which the pen stroke is within the selection location when the persistent age is greater than the predetermined period and when the length of the pen stroke across a data item is greater than 50% of the size of the data item in the direction of the selection direction.

24. The computing system according to claim 23, wherein the predetermined period is 2 seconds and the selection direction is left-to-right.

25. The computing system according to claim 23, wherein the selection location corresponds to the middle of the vertical side of a data item; and
  the selection size corresponds to 25% of the size of the data item centered around the selection location.

* * * * *